Figure 1:
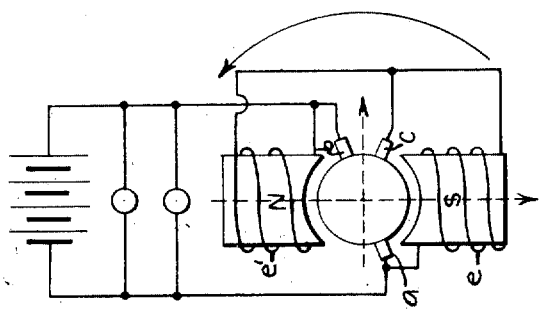

M. ARENDT.
ELECTRIC GENERATOR.
APPLICATION FILED MAY 28, 1913.

1,237,272.

Patented Aug. 21, 1917.
3 SHEETS—SHEET 1.

WITNESSES:
CBSchroeder
E. L. Ellis

INVENTOR
Morton Arendt
BY
Pennie Davis & Goldsborough
ATTORNEYS

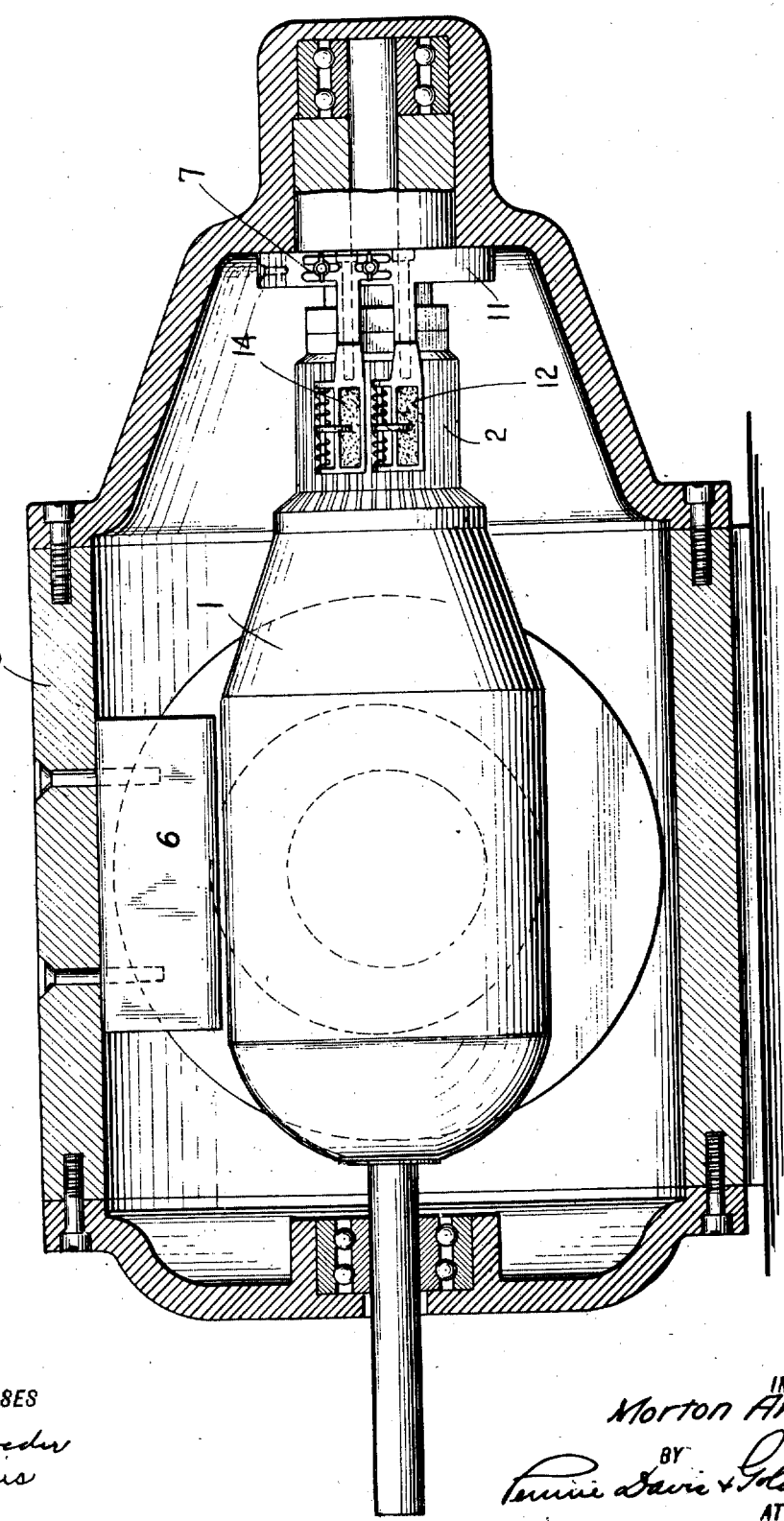

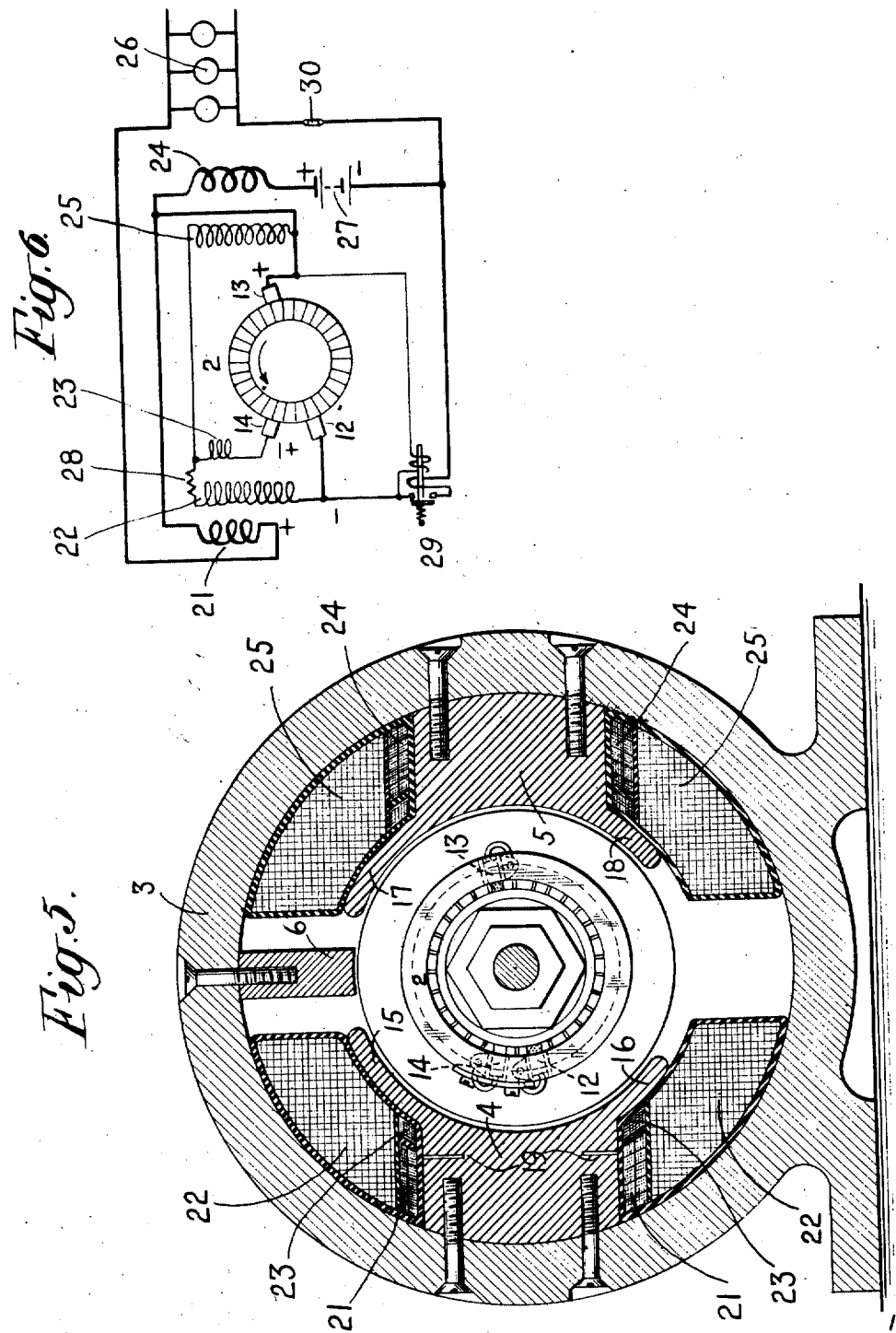

UNITED STATES PATENT OFFICE.

MORTON ARENDT, OF NEW YORK, N. Y.

ELECTRIC GENERATOR.

1,237,272.  Specification of Letters Patent.  Patented Aug. 21, 1917.

Application filed May 28, 1913. Serial No. 770,463.

*To all whom it may concern:*

Be it known that I, MORTON ARENDT, a citizen of the United States, residing at and whose post-office address is Ansonia Hotel, Broadway and 73rd street, borough of Manhattan, city, county, and State of New York, have invented certain new and useful Improvements in Electric Generators; and I do hereby declare the following to be a full, clear, and exact description of the invention, such as will enable others skilled in the art to which it appertains to make and use the same.

The invention or discovery disclosed in the following description, and illustrated in the accompanying drawings, provides a direct current electric generator, having an inherent capacity for self-regulation over a wide speed range such that it is well adapted, without regulating adjuncts, to supply current to lighting systems on vehicles such as motor cars, boats, railway cars and the like, wherein the speed of the driving source (the axle or the driving motor of the vehicle is subject to frequent and abrupt variations over a wide range. The self-regulating characteristic of the generator in its preferred form results primarily from the utilization within its structure of exaggerated unsymmetrical magnetic effects and an electrically unbalanced armature. It is well known that a secondary battery connected across the terminals of a generator has an effect, because of its low internal resistance and high counter-electromotive force, substantially to fix the potential of the system. If the potential between the main brushes of such a generator is divided by an auxiliary brush so associated with the main brushes that armature conductors in the neutral zone (demagnetizing turns) are included between the auxiliary brush and the leading main brush, while armature conductors in the active zone (cross magnetizing turns) are included between the auxiliary brush and the trailing main brush, then as either the speed of the armature or the armature current increases the potential difference between the auxiliary brush and the leading main brush will progressively increase while the potential difference between the auxiliary brush and the trailing main brush will correspondingly diminish, and if the brushes are properly positioned as hereinafter described, the potential difference between the auxiliary brush and the trailing main brush will fall to zero and reverse. The result of this is that there exists between the auxiliary brush and the trailing main brush a potential difference, which is, generally speaking, of a nature suitable for producing self-regulating excitation of the machine.

If the main field of the machine is excited by the voltage between the auxiliary brush and the trailing main brush, there will result a generator which has the characteristic that, after the normal output has been reached, the voltage generated will not further increase with increase of speed; but I have found that if such generator is subjected to the wide speed variations which may be expected of the internal combustion engine of a motor car, for example, the voltage generated will fall abruptly after a certain speed has been reached. That is to say, the range of automatic regulation to the constant conditions required is not sufficiently wide. This range may be extended in several ways. Thus the increasing voltage between the auxiliary brush and the leading main brush may be utilized to supplement the excitation due to the decreasing voltage between the auxiliary brush and the trailing main brush, by providing a sectionalized but electrically continuous exciting winding connected at its extremities to the main brushes in the ordinary shunt relation, and connected at an intermediate point to the auxiliary brush. Inasmuch as the increase of voltage between the auxiliary brush and the leading main brush is substantially equal to the decrease of voltage between the auxiliary brush and the trailing main brush, the regulating effects of the two, when both are used for excitation purposes, might be expected to neutralize one another if the arrangement could be such that the changes of magnetic flux ultimately due to the variations of the two voltages were proportionate to these variations; but inasmuch as one voltage is falling and the other rising, the flux decrease will necessarily exceed the flux increase because of the change of permeability due to greater or less saturation of the iron of the magnetic circuit. This predominance of the field-weakening effect over the field strengthening effect may be further emphasized by giving to the exciting circuit connected between the auxiliary brush and the leading main brush a greater resistance than the exciting circuit connected between the auxiliary brush and the trailing main brush; or by giving to the magnetic circuit excited by the voltage between the auxiliary brush and the leading main brush a greater reluctance than the magnetic circuit excited by the voltage between the auxiliary brush and the trailing main brush.

As a practical matter, I have found that a generator embodying the principles just announced will have a capacity for self-regulation over a range such as to constitute an entirely practical and valuable lighting generator for the purposes indicated, particularly for motor car lighting in which the regulation of the lamps is not required to attain that degree of accuracy which is desirable in train lighting.

I have found, however, that the regulation of the generator is further improved if the effects of the unbalanced armature above described are supplemented by the effects of an unbalanced field structure of such a character as to emphasize and exaggerate the regulating effects of the unbalanced armature arrangement, and which has in itself a capacity for giving to the direct current generator a self-regulating characteristic of substantial practical value. To this end I destroy the symmetry and reduce the reluctance of the magnetic circuit of the armature flux by interposing between the field frame and the armature, at one side thereof, an interpole, which is without an exciting winding but which serves to localize and direct the armature flux. The effect of this pole is not only to decrease the magnetic reluctance of the circuit through which the armature flux passes, but it is also to direct that flux in such a manner that it so increases the flux under one main pole and decreases the flux under the other main pole as to exaggerate the regulating effect above described.

Figure 2:
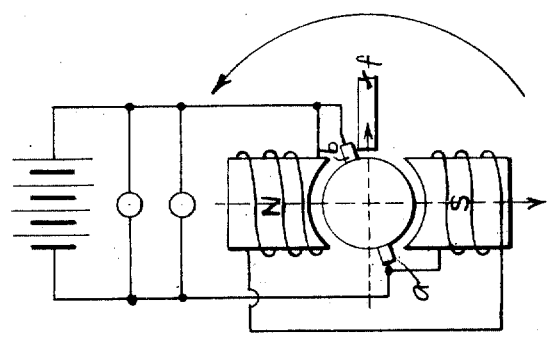
Figure 3:
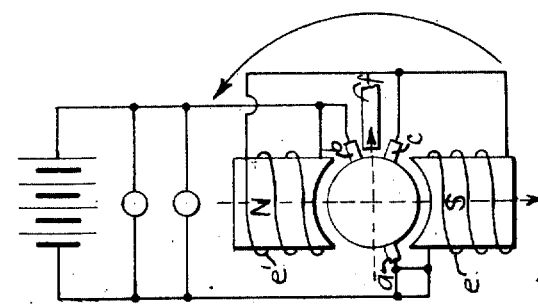

Referring to the accompanying drawings:

Figures 1, 2 and 3 are diagrammatic representations of different modifications illustrating the application of the several features of my invention, and Figs. 4, 5 and 6 represent a longitudinal section, a transverse section drawn to scale and a wiring diagram of a generator constructed and operated by me and which represents the best mode in which I have contemplated applying the principles of my invention or discovery.

The diagram of Fig. 1 illustrates a machine having the usual field magnet structure of the two pole type and the usual armature together with the main brushes $a$ and $b$ which are advanced in the direction of rotation as illustrated; together with the auxiliary brush $c$ so placed on one side of the armature as to include between it and the leading main brush $b$ a substantial number of armature conductors at right angles to the line of the main field flux N S. In practice I have so placed the auxiliary brush $c$ that from eight (8) to twelve (12) per cent of the armature turns are included between it and the leading main brush $b$. For the purpose of producing close regulation over a wide speed range there is provided a sectionalized but electrical continuous field winding connected at its outer ends to the main brushes $a$ $b$ in the ordinary shunt relation and connected at an intermediate point to the auxiliary brush $c$. The sections of the field winding thus excited provide different excitation for the parts of the field structure so that to a substantial degree the falling off in excitation current in the winding $e$, which is connected between the auxiliary brush $c$ and the trailing main brush $a$, is counterbalanced by the increase of excitation current in the winding $e'$ connected between the auxiliary brush $c$ and the leading main brush $b$. Because of the effect of magnetic saturation of the iron of the magnetic circuit, however, the decrease in flux will exceed the increase in flux and the final result will be a diminution of the total field when either the speed of rotation of the armature or the armature current increases.

In the arrangement shown in Fig. 2, the auxiliary brush $c$ is not used, but the regulating effect is attained entirely by the unsymmetrical arrangement of the field magnet structure resulting from the interposition of the interpole $f$ between the main poles, and the advancement of the main brushes in the direction of rotation. The effect of this interpole is to reduce the reluctance of the magnetic circuit of the armature flux, and at the same time to unbalance that circuit so as to draw a preponderance of the flux to one side of the armature. The result is that as the armature current increases the increasing armature flux is so led into the main poles as to bring about a decrease of the flux over the whole face of the trailing main pole and an increase of the flux over the whole face of the leading main pole, the decrease exceeding the increase and thereby effecting a substantial regulation giving a slowly rising current characteristic. If the armature winding be of the Gramme ring type, or of the multiple circuit drum type which is possible in a multipolar machine, the unbalancing of the magnetic field will further result in an unbalancing of the current in the different sections of the armature winding, giving an effect similar to the unbalanced electrical conditions present when the auxiliary brush $c$ is used.

In the arrangement illustrated in Fig. 3 the unbalanced magnetic structure of Fig. 2 is combined with the electrically unbalanced armature arrangement of Fig. 1 so that the combined effects above described are obtained. In this combined arrangement, therefore, the magnetic flux in the portions of the armature core dominated by the different main poles has different strengths and varies at different rates; while the portion dominated by the interpole has still another value and another rate of variation, and the effect of this unsymmetrical field structure is increased by the provision of a sectionalized exciting winding carrying currents which vary in such manner as to intensify the self-regulating effect of the unsymmetrical field. The result is to produce a stable generator having an inherent characteristic of self-regulation over a very wide range of operative conditions.

The specific generator illustrated in Figs. 4, 5 and 6 has a cast steel field frame 3 to which are bolted in radial disposition the two main poles 4 and 5 and the interpole 6. The shunt field windings 22 and 25 are provided each with 300 turns of 19 B. & S. gage wire. The series coils 21 and 24 comprise respectively 7 and 21 turns of No. 19 B. & S. wire, and resistance 28 has a value of about one and one-quarter (1¼) ohms. The armature 1 is of the ordinary toothed core type having thirty (30) slots, and carries a usual form of drum winding consisting of 360 inductors of No. 16 B. & S. wire wound in thirty (30) coils. This winding is connected to an ordinary form of commutator having thirty (30) commutator bars, and upon which bear ordinary main collector brushes 12 and 13 and an auxiliary brush 14 so located as to include between it and the leading main brush 12 those armature coils which are dominated by the interpole and through which the armature flux passes. These brushes 12, 13 and 14 are mounted upon the brush holder ring 11 which is concentric with and capable of angular adjustment about the armature shaft. The brush 14 is supported from ring 11 by slotted connection 7 (see Fig. 4) so that its displacement with respect to the main brush 12 may readily be adjusted. The usual displacement is two and one-half (2½) to three (3) commutator segments.

The poles 4 and 5 are diametrically disposed, but the shoes thereof are each unsymmetrical, the arrangement being such that the adjacent ends 15 and 17 of the pole pieces have a greater angular extent than the other ends 16 and 18, so that the space between the pole tips 15 and 17 in which interpole 6 is located, is of lesser angular extent than the space between the pole tips 16 and 18, so as to exaggerate the magnetic leakage on that side of the armature. Furthermore, the pole 4 is slotted as at 19 to give a reluctance higher than that of pole 5. The windings 22 and 25 are connected in electrical series with each other across the main brushes 12 and 13, in shunt relation to the external circuit containing the incandescent lamps 26 and the battery 27, while the third brush 14 is connected through the exciting winding 23 to a point intermediate the windings 22 and 25. The storage battery 27 is connected in series with one portion 24 of the series exciting winding across the brushes 12, 13 and the other portion 21 of the series exciting winding is connected in series with the lamps. The resistance 28 is inserted between the connection to the third brush 14 and the exciting winding 22 for the direction of rotation indicated by the arrow in Fig. 6. The system is also provided with the automatic voltage switch 29 adapted to connect the generator to the battery when the voltage of the generator reaches a sufficient value, and the switch 30 is provided for switching the lamps 26 in and out of circuit. The lamps may also have their individual switches.

The shunt field coils 22 and 25 coöperate to produce the effective field flux at low speeds, and at the high range of speed, after the current in coil 25 has reversed, the magnetomotive forces of these coils oppose each other. Auxiliary coil 23 is so connected to auxiliary brush 14 that it at first coöperates with the predominating field, but at higher speeds, when the potential difference between brushes 12 and 14 exceeds that between 12 and 13, it opposes the manetizing effect of coil 22; and this action increases with increase of potential difference between brushes 12 and 14. The series field winding of relatively few turns, comprising coils 21 and 24 is connected in its entirety between one terminal of battery 27 and one of load 26, in such a manner that the lamp current through coils 21 and 24 is effective to fix the polarity of the generator to conform with that of the battery. The connection of main brush 13 to this same winding is such that when the generator supplies current, coil 21 in series with the lamps constitutes an accumulative winding coöperating with shunt coil 22, tending to compensate for potential drop in the lamp circuit, while coil 24 conveying current from the generator to battery constitutes a differential winding with respect to the predominating field.

From the foregoing description and illustrative diagrams of four typical arrangements in which the several features of improvement are employed individually and in combination, and from the detailed description and illustration of a specific machine which I have constructed in accordance with the invention, the true nature and scope of my invention will be understood. The description has been restricted to two-pole machines for the sake of simplicity and because the particular machine illustrated in Figs. 4, 5 and 6 was so designed, but as all electrical engineers will understand the invention may be embodied in multipolar machines. In the case of wave-wound armatures the three brushes represented for the bi-polar machine will suffice. With lap windings, however, the brushes should be duplicated for each pair of main poles. In such case all brushes 14 will be connected together, as is the practice with respect to the main brushes of the same sign.

Those slight variations in operating characteristics which commonly occur in machines constructed from the same design, by reason of unavoidable departure from test samples of the material prepared in bulk may be compensated by slight variation of the angular displacement of brush 14 with respect to brush 12 or by a slight change of the resistance 28, or by both.

In case the machine is to be driven from a car axle so that the direction of rotation is subject to reversal, field coil 23 and slots 19 are omitted and provision is made for rotating the main brushes through 180°, and for moving the auxiliary brush to the other side of the interpole region, the main brush and the auxiliary brush being mounted on separate brush holder rings for this purpose.

What I claim is:

1. A dynamo-electric machine having an armature with a distributed winding and a many part commutator, main commutator brushes for collecting the work current, said main brushes being advanced from the geometrical neutral position, and an auxiliary brush, the brushes being so located on the commutator as to include between the auxiliary brush and the leading main brush the zone of armature conductors lying adjacent the axis of the armature field, a sectionalized but electrically continuous exciting winding for the machine, one portion of the exciting winding being connected between the auxiliary brush and the leading main brush and another portion being connected between the auxiliary brush and the trailing main brush.

2. A dynamo-electric machine having an armature with a distributed winding and a many part commutator, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the machine, one portion of the exciting winding being connected between the auxiliary brush and the leading main brush and another portion being connected between the auxiliary brush and the trailing main brush and the circuit connecting the auxiliary brush with the leading main brush having a greater electric resistance than the circuit connecting the auxiliary brush with the trailing main brush.

3. A dynamo-electric machine having an armature with a distributed winding and a many part commutator, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the machine and separate field structure elements of different magnetic reluctance on which the sections of the exciting winding are wound, that portion of the exciting winding which is on the field structure element of less magnetic reluctance being connected between the auxiliary brush and the trailing main brush and that portion of the exciting winding which is on the field structure element of greater magnetic reluctance being connected between the auxiliary brush and the leading main brush.

4. A dynamo-electric machine having an armature with a distributed winding and a many part commutator, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the machine and separate field structure elements of different magnetic reluctance on which the sections of the exciting winding are wound, that portion of the exciting winding which is on the field structure element of less magnetic reluctance being connected between the auxiliary brush and the trailing main brush and that portion of the exciting winding which is on the field structure element of greater magnetic reluctance being connected between the auxiliary brush and the leading main brush and the circuit connecting the auxiliary brush with the leading main brush having a greater electric resistance than the circuit connecting the auxiliary brush with the trailing main brush.

5. A dynamo-electric machine having an armature with a distributed winding and a many part commutator, an unsymmetrical field structure in which the magnetic reluctance of the armature flux path is substantially reduced between alternate main poles, main commutator brushes for collecting the work current, an auxiliary commutator brush, and an exciting field winding connected to the auxiliary brush.

6. A dynamo-electric machine having an armature with a distributed winding and a many part commutator, an unsymmetrical field structure having main field magnetic circuits of different magnetic reluctance and in which the magnetic reluctance of the armature flux path is substantially reduced between alternate main poles, main commutator brushes for collecting the work current, and a shunt exciting winding for the field structure.

7. A dynamo-electric machine having an armature with a distributed winding and a many part commutator, an unsymmetrical field structure in which the magnetic reluctance of the armature flux path is substantially reduced between alternate main poles, main commutator brushes for collecting the work current, and an auxiliary brush, the brushes being so located on the commutator as to include between the auxiliary brush and the leading main brush the zone of armature conductors lying adjacent the axis of the armature field, and an exciting winding for the field structure connected between the auxiliary brush and the trailing main brush.

8. A dynamo-electric machine having an armature with a distributed winding and a many part commutator, an unsymmetrical field structure in which the magnetic reluctance of the armature flux path is substantially reduced between alternate main poles, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the field structure, one portion of the exciting winding being connected between the auxiliary brush and the leading main brush, and another portion being connected between the auxiliary brush and the trailing main brush.

9. A dynamo-electric machine having an armature with a distributed winding and a many part commutator, an unsymmetrical field structure in which the magnetic reluctance of the armature flux path is substantially reduced between alternate main poles, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the field structure, one portion of the exciting winding being connected between the auxiliary brush and the leading main brush, and another portion being connected between the auxiliary brush and the trailing main brush, and the circuit connecting the auxiliary brush with the leading main brush having a greater electric resistance than the circuit connecting the auxiliary brush with the trailing main brush.

10. A dynamo-electric machine having an armature with a distributed winding and a many part commutator, an unsymmetrical field structure having main field magnetic circuits of different magnetic reluctance and in which the magnetic reluctance of the armature flux path is substantially reduced between alternate main poles, main commutator brushes for collecting the work current, and a sectionalized but electrically continuous exciting winding for the different main field magnetic circuits, that portion of the exciting winding which directly excites the main field circuit of less magnetic reluctance being connected between the auxiliary brush and the trailing main brush and that portion of the exciting winding which directly excites the main field circuit of greater magnetic reluctance being connected between the auxiliary brush and the leading main brush.

11. A dynamo-electric machine having an armature with a distributed winding and a many part commutator, an unsymmetrical field structure having main field magnetic circuits of different magnetic reluctance and in which the magnetic reluctance of the armature flux path is substantially reduced between alternate main poles, main commutator brushes for collecting the work current, and a sectionalized but electrically continuous exciting winding for the different main field magnetic circuits, that portion of the exciting winding which directly excites the main field circuit of less magnetic reluctance being connected between the auxiliary brush and the trailing main brush and that portion of the exciting winding which directly excites the main field circuit of greater magnetic reluctance being connected between the auxiliary brush and the leading main brush, and the circuit connecting the auxiliary brush with the leading main brush having a greater electric resistance than the circuit connecting the auxiliary brush with the trailing main brush.

12. A dynamo-electric machine having an armature with a distributed winding and a many part commutator, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous exciting winding for the machine connected in shunt to the main brushes and a conductor including an additional exciting winding connected between the auxiliary brush and an intermediate point of the said sectionalized shunt exciting winding.

13. The combination with a generator having main collecting brushes and an auxiliary brush, a shunt exciting winding connected to the auxiliary brush, and a sectionalized series exciting winding, of a battery and a translating device supplied from the generator, one section of the series winding being connected across the main brushes in series with the translating device, and the other section of the series winding being connected across the main brushes in series with the battery.

14. The combination with a generator having main collecting brushes and an auxiliary brush, a sectionalized shunt field winding connected to the main brushes and also connected to the auxiliary brush, and a sectionalized series exciting winding, of a battery and a translating device supplied from the generator, one section of the series winding being connected across the main brushes in series with the translating device, and the other section of the series winding being connected across the main brushes in series with the battery.

15. A dynamo electric machine having an armature with a distributed winding and a many part commutator, an unsymmetrical field structure in which the magnetic reluctance of the armature flux path is substantially reduced between alternate main poles, main commutator brushes for collecting the work current, and an auxiliary brush, the brushes being so located on the commutator as to include between the auxiliary brush and the leading main brush the zone of armature conductors lying adjacent the axis of the armature field, a sectionalized but electrically continuous shunt exciting field winding having one portion connected between the auxiliary brush and the leading main brush and another portion connected between the auxiliary brush and the trailing main brush, and a sectionalized series exciting field winding having one portion connected across the main brushes in series with the translating device and another section connected across the main brushes in series with the battery.

16. A dynamo electric machine having an armature with a distributed winding and a many part commutator, an unsymmetrical field structure comprising main field poles with unsymmetrical pole shoes producing alternate spaces between the pole shoe tips of different extent, and an unwound interpole in the smaller interpolar space, main commutator brushes for collecting the work current, and an exciting winding for the field structure.

In testimony whereof I affix my signature, in presence of two witnesses.

MORTON ARENDT.

Witnesses:
M. A. BILL,
LEON W. ROSENTHAL.